(12) United States Patent
Fishbein et al.

(10) Patent No.: US 7,307,386 B2
(45) Date of Patent: Dec. 11, 2007

(54) PROCESS FOR OPERATING A DISCHARGE LAMP

(75) Inventors: Omri Fishbein, Kibbutz Ein Hashofet (IL); Eran Erez, Kibbutz Ein Hashofet (IL)

(73) Assignee: Eltam Ein Hashofet, Kibbutz Ein Hashofet (IL)

( * ) Notice: Subject to any disclaimer, the term of this patent is extended or adjusted under 35 U.S.C. 154(b) by 36 days.

(21) Appl. No.: 11/169,727

(22) Filed: Jun. 30, 2005

(65) Prior Publication Data

US 2006/0006818 A1  Jan. 12, 2006

(30) Foreign Application Priority Data

Jul. 8, 2004  (IL) .................................... 162916

(51) Int. Cl.
*H05B 37/02* (2006.01)
*H05B 41/16* (2006.01)

(52) U.S. Cl. ...................... 315/226; 315/247; 315/308; 315/309

(58) Field of Classification Search ................ 315/291, 315/307, 308, 309, 224, 225, 226, 246, 247, 315/360, DIG. 7
See application file for complete search history.

(56) References Cited

U.S. PATENT DOCUMENTS

| 5,677,602 | A | * | 10/1997 | Paul et al. | .................... 315/224 |
| 6,072,283 | A | * | 6/2000 | Hedrei et al. | ................ 315/307 |
| 6,914,395 | B2 | * | 7/2005 | Yamauchi et al. | ........... 315/308 |
| 6,975,077 | B2 | * | 12/2005 | Izumi et al. | ............. 315/209 R |
| 7,023,143 | B2 | * | 4/2006 | Harada et al. | ........... 315/209 R |
| 2004/0217742 | A1 | * | 11/2004 | Ribarich et al. | ............. 323/222 |

* cited by examiner

*Primary Examiner*—Thuy Vinh Tran
(74) *Attorney, Agent, or Firm*—Kenyon & Kenyon LLP

(57) ABSTRACT

There is provided a process for operating a High Intensity Discharge (HID) lamp, having stable and transient operating phases, by a digitally controlled circuit that includes a DC supply and an inverter. During the stable operating phase of the lamp, the inverter's input DC voltage is maintained at a value depending on the lamp voltage.

58 Claims, 5 Drawing Sheets

PROCESS FOR OPERATING A DISCHARGE LAMP

FIELD OF THE INVENTION

The present invention relates to the operation of High Intensity Discharge (HID) lamps, and more particularly to a process for igniting, operating and monitoring the operation of HID lamps.

BACKGROUND OF THE INVENTION

In recent years, an increasing number of electronic ballasts are being used in the lighting industry relating to HID lamps. State of the art electronic ballasts utilize a circuit comprising a passive input filter, a Power Factor Correction (PFC) stage, an inverter and an ignitor. The state of the art ballasts are designed to maintain a relatively high Open Circuit Voltage (OCV) and high DC voltage source for the inverter. Consequently, unnecessary losses are developed in the circuit, specifically, but not exclusively, during the lamp's initial transient phase that follows the ignition of the arc while the lamp's voltage is low and its current is high.

SUMMARY OF THE INVENTION

It is therefore a broad object of the present invention to ameliorate the disadvantages of the prior art electronic ballasts, and to provide a process for operating HID lamps that improves the ballast functioning.

It is a further object of the present invention to provide a process for operating HID lamps that secures ignition, glow-to-arc transition and efficient control of the lamp's transient High-current/Low-voltage phase and normal operation thereafter.

It is still a further object of the present invention to provide ballast protection and to lower ballast losses, EMI generation and circuit cost.

In accordance with the present invention there is therefore provided a process for operating a High Intensity Discharge (HID) lamp, having stable and transient operating phases, by means of a digitally controlled circuit that includes a DC supply and an inverter, said process being characterized by that during the stable operating phase of the lamp, the inverter's input DC voltage is maintained at a value depending on the lamp voltage.

In accordance with another aspect of the invention an algorithm is provided for digital control of a 2-switch PFC active filter. This algorithm is based on the mean value of the ratio Vin/Vout of said filter. Thereby a power factor higher than 0.96 (actually about 0.99) and input current Total Harmonic Distortion (THD) lower than 10%, are achievable within a very wide range of Vin and Vout.

A still further aspect of the invention is that load current sensing is performed by a simple current peak-detector, thus providing low measurement noise and a current sensing resistor having minimum value and minimum losses.

Still further, according to the invention the operation of the PFC comprises boost and modified-boost modes, both critically discontinuous. The boost mode is achieved with the buck switch continuously conducting and the boost switch operating at high frequency. When the input AC instantaneous voltage approaches the value of the output DC voltage, a "watchdog" timer is activated in the control circuit of the buck switch to block said switch when the inductor's discharge duration becomes too long, say, twice the charge time. Consequently, the inductor discharge is substantially accelerated and appropriate operating frequency is maintained. When the inductor current has discharged, both switches begin conduction thus initiating a new cycle of discharge-time-limited boost (modified boost). The modified-boost mode during the phase in which the input AC voltage value is between 70 to 130% of the value of the output DC voltage, improves the efficiency of the circuit and smoothes the transitions between the modes.

Yet a further feature of the present invention is a procedure that facilitates efficient transitions from mode to mode of the PFC operation, i.e. the transitions from buck to buck-boost, from buck-boost to boost and vice versa, during which reduction of watt-loss, peak current and THD are achievable. The procedure consists of a turn-on of each switch near zero current of the inductor followed by control of the on-time of each switch as follows:

The buck switch on-time is gradually reduced and said boost switch on-time is gradually increased during transition from buck operation mode to buck-boost operation mode and during transition from boost operation mode to buck-boost operation mode of the PFC; and The buck switch on-time is gradually increased and the boost switch on-time is gradually reduced during transition from buck-boost operation mode to boost operation mode and during transition from buck-boost operation mode to buck operation mode of the PFC.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a block diagram of an embodiment of a programmable ballast circuit for effecting the process according to the present invention;

FIG. 2 is a flow diagram illustrating a preferred embodiment of the process according to the present invention;

FIG. 3 is a circuit diagram of an embodiment of the PFC stage, shown in FIG. 1;

FIG. 4 is a circuit diagram of an embodiment of an inverter, shown in FIG. 1;

FIG. 5 is a plot of a prior art input current half wave envelope, and

FIG. 6 is a plot of an input current half wave envelope according to the invention.

DETAILED DESCRIPTION

Figure 1:
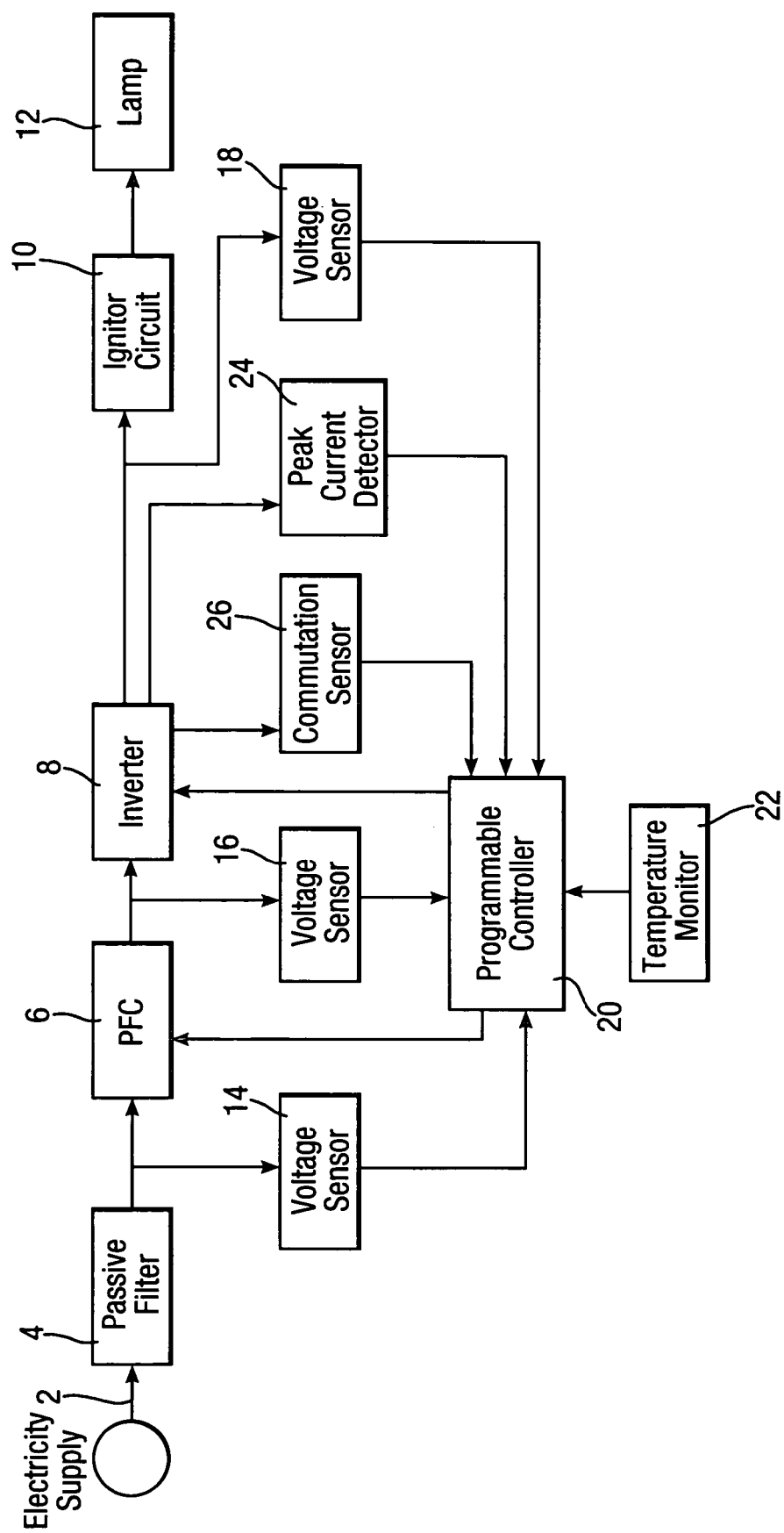

In FIG. 1 there is illustrated a block diagram of an embodiment of a programmable ballast for the implementation of the present invention. The electrical energy flows from an electricity supply via line 2 through a passive filter 4, a PFC stage 6, an inverter 8 and an ignitor circuit 10 into an HID lamp 12. Three voltage sensors 14, 16 and 18 are provided that sense the PFC input voltage, its output voltage and the lamp voltage, respectively, and deliver the respective voltage data to a programmable controller 20. Also provided is a temperature monitor 22 that delivers to the controller 20 data relating to the circuit temperature, thereby enabling the controller 20 to prevent excessive temperatures in the ballast, by reducing the power delivered through the circuit to the lamp 12. Lamp current is sensed and monitored through a peak-current-detector 24 provided in the inverter 8. Also seen is a commutation sensor 26.

Figure 2:
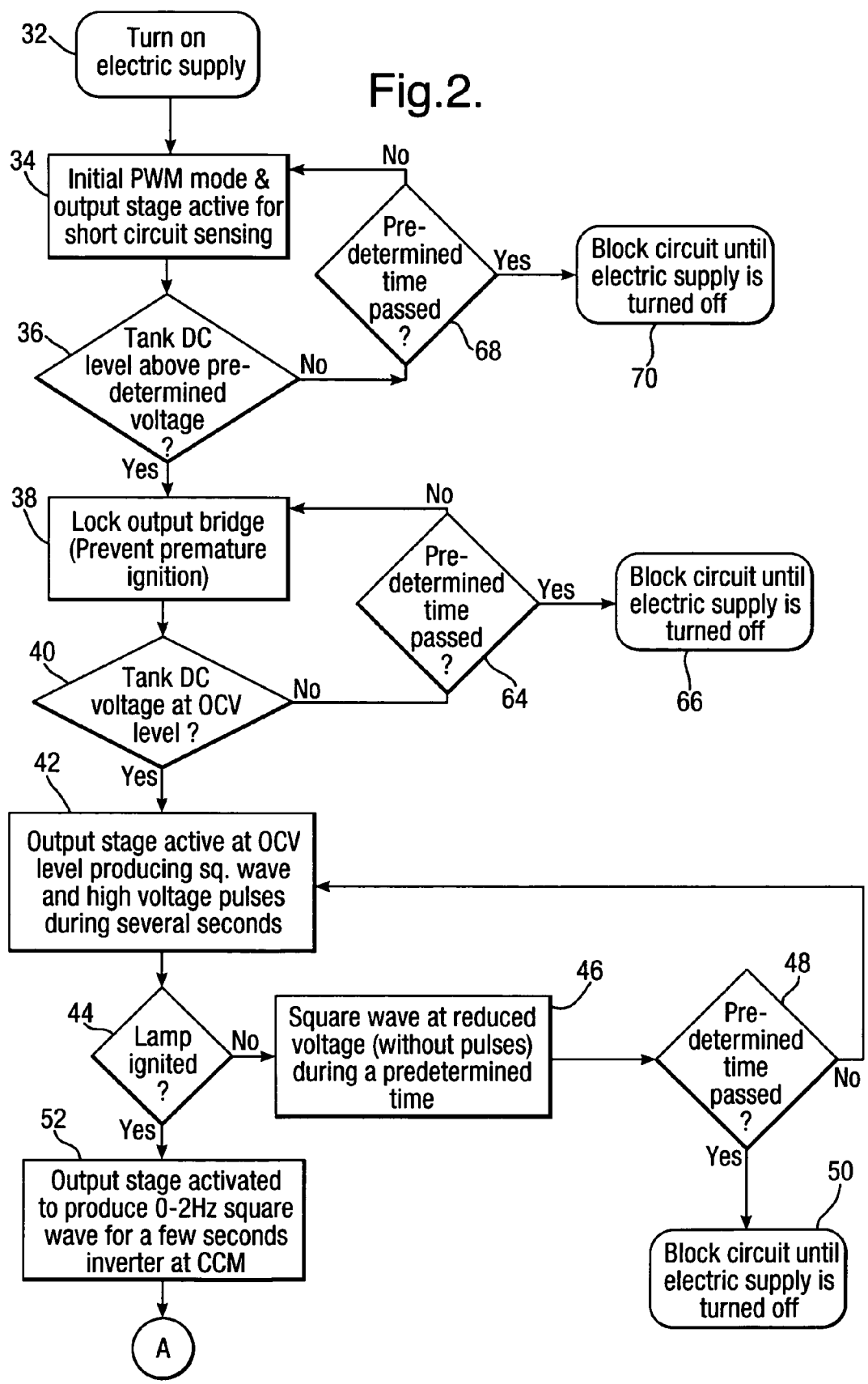
Figure 2:
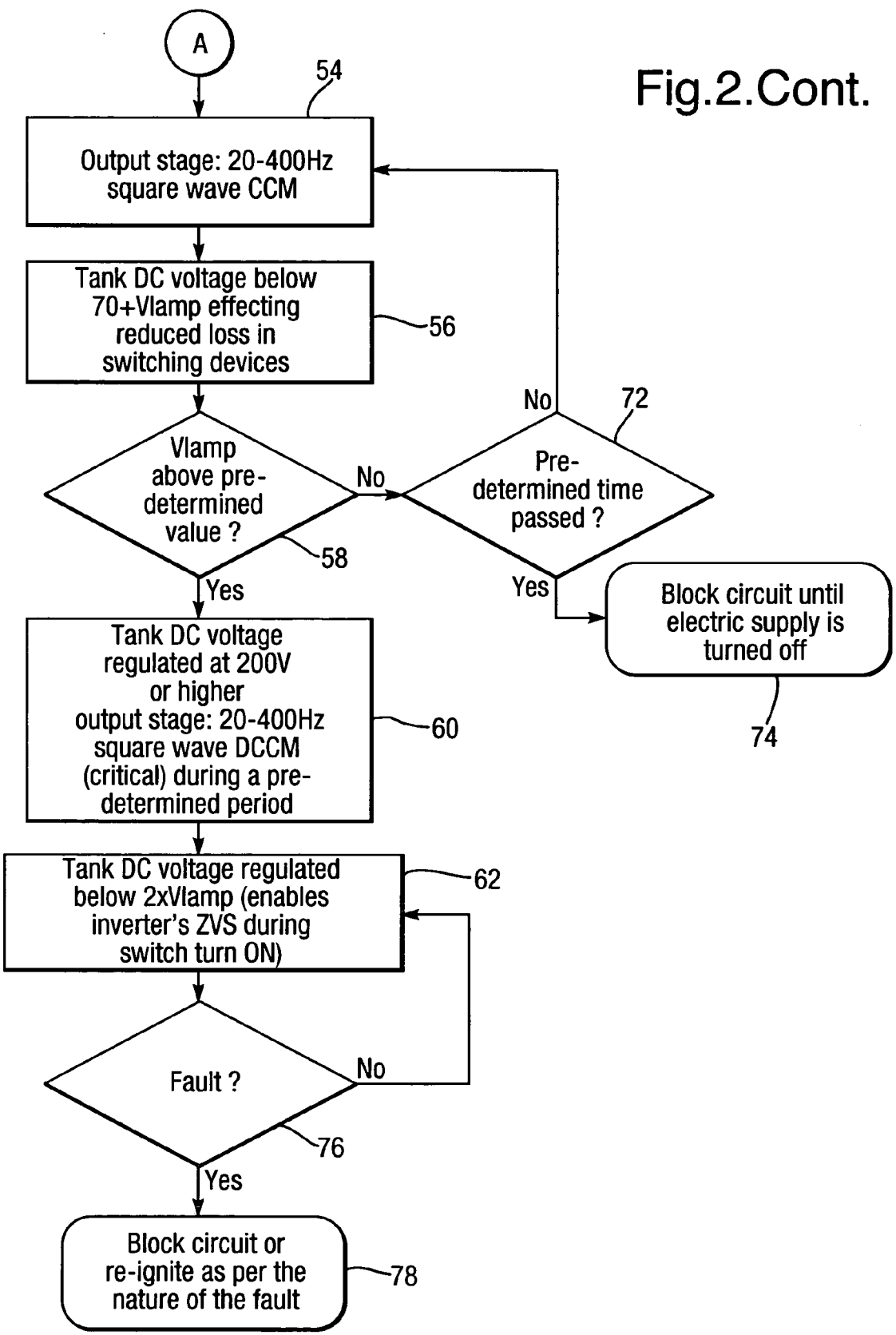

FIG. 2 illustrates a flow diagram of a preferred embodiment of the process according to the invention. Following the turning on (32) of the ballast, electrical energy flows into the circuit from an electricity supply and actuates the circuit's controller 20, which operates the circuit in Pulse Width Modulation (PWM) mode, thus loading a DC tank 92 (FIG. 3) of the PFC stage 6 and preparing it to operate the lamp 12 at its initial phase. Simultaneously, at (34), circuit outputs are checked for a short circuit condition by activating the inverter 8. The controller 20 now checks the voltage across said DC tank 92 (FIG. 3) of the PFC stage 6 and measures the time which has elapsed. If the voltage is below a predetermined value, e.g., 80-150V (see 36 N) and time elapsed is less than a predetermined period, e.g., 0.1-1 second (see 68 N) the charging of said DC tank 92 proceeds. If the time has elapsed (68 Y) the circuit is blocked until the electricity supply turns off. Upon reaching the predetermined voltage value (36 Y) the controller 20 locks the inverter 8, in order to prevent premature ignition of "easy to ignite" lamps, e.g., mercury lamps. The controller 20 now checks again the voltage across said DC tank and measures the time which has elapsed. If said DC voltage is below its predetermined OCV level (40 N) and the time which has elapsed is less than the predetermined period (64 N), the charging of the DC tank 92 proceeds. If the time has elapsed (64 Y), the circuit is blocked until the electricity supply turns off. Upon reaching the predetermined OCV level, e.g., 150-300V (at 40 Y), the inverter 8 begins to supply the lamp with a square wave of a predetermined voltage and frequency of e.g., 150-300V/20-400 Hz. This wave is accompanied by super positioned high voltage ignition-pulses, e.g., 1-6 kV, which appear at each polarity change of the square-wave. This state lasts a few seconds, e.g., 3-10 seconds (see 42). Should the lamp fail to ignite (44 N), the circuit reduces the square wave voltage to 120-140V/20-400 Hz (with no high voltage pulses) for the following 30-40 seconds (see 46), after which the ignition process is repeated. Should ignition continue to fail for 30-40 ignition cycles, i.e., for approximately 30-35 minutes (see 48), the controller blocks the circuit until the electricity supply is disconnected (50). In the event that the lamp is successfully ignited (44 Y), it is fed with low frequency square-wave current for a predetermined time, e.g. 2-3 seconds, at Continuous Current Mode (CCM) (52), and thereafter, with square wave current of 20-400 Hz (54). During this phase the inverter 8 is operated in the CCM and the switches 94 in the inverter 8 are heavily loaded. Said DC tank voltage is now regulated to follow a value not higher than 70V plus the lamp voltage (70V+Vlamp), in order to reduce the losses in the switches (56). Vlamp is now rising with increasing lamp plasma pressure. If Vlamp is below a predetermined value, e.g. 50-60V (58 N) and the time which has elapsed is less than a predetermined period, e.g. 4-5 minutes (72 N), the circuit continues to feed the lamp with current. If, however, said period has elapsed (72 Y) the circuit is blocked until the electricity supply is turned off. Upon reaching a predetermined voltage, e.g. 50-60V (58 Y), the output stage operating mode changes to produce a square wave of 20-400 Hz at Discontinuous Current Mode (DCCM) (60). Finally, the DC tank 92 voltage is regulated to maintain a value approximately twice the lamp voltage or between the lamp voltage and twice the lamp voltage, in order to enable zero voltage ON switching of the inverter's switches 94 (62). This mode prevails as long as the circuit continues to operate normally. Should any fault occur (76 Y), the circuit is blocked or re-ignites according to the nature of the fault (78).

Figure 3:
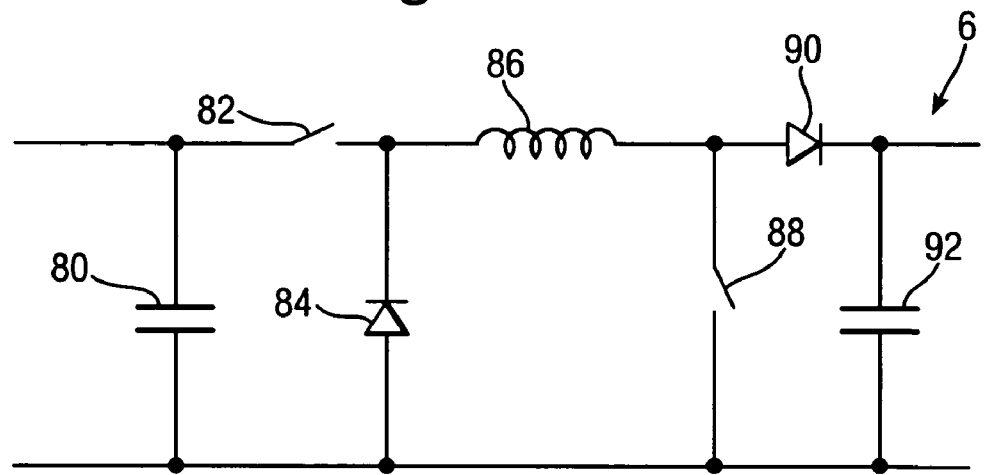
Figure 4:
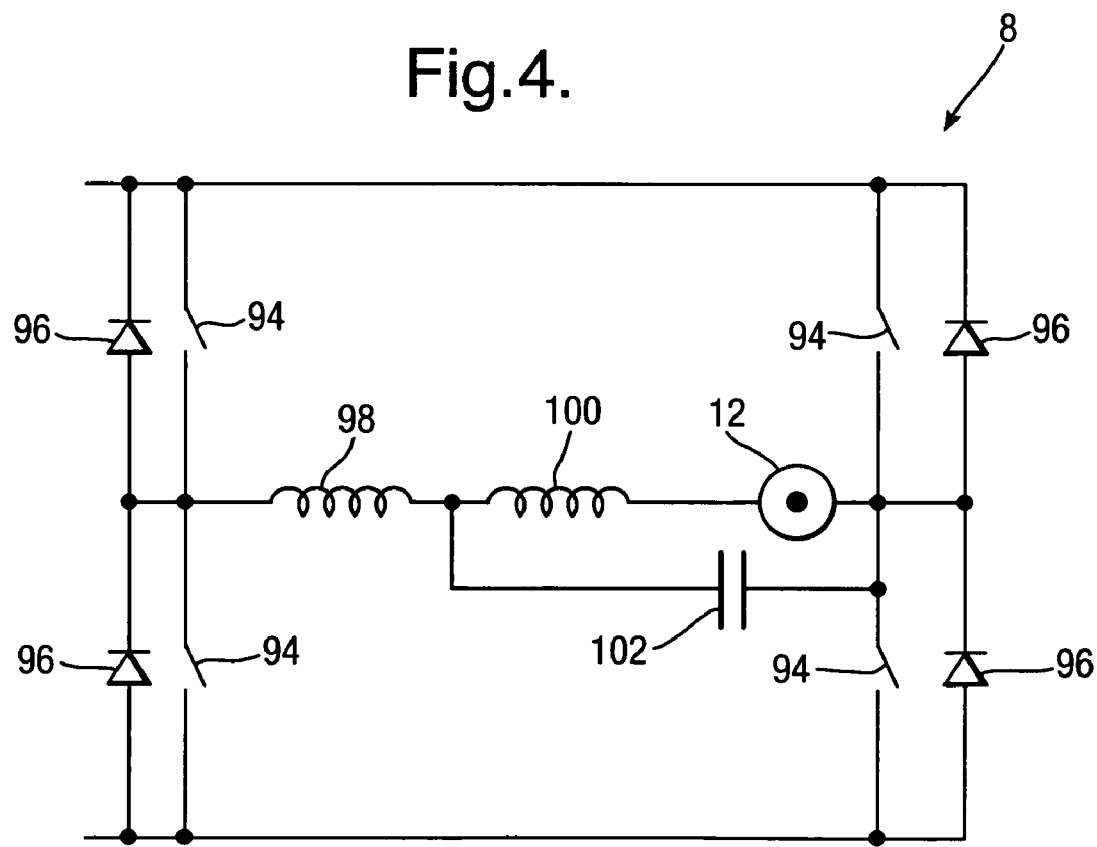

FIG. 3 illustrates a preferred, non-limiting embodiment of the PFC stage 6 comprising a filter capacitor 80, a buck switch 82, a free wheeling diode 84, a buck-boost inductor 86, a boost switch 88, a blocking diode 90 and a DC tank 92 e.g., a capacitor. Similarly, FIG. 4 illustrates a preferred, non-limiting embodiment of the inverter 8. Seen are switches 94 and diodes 96 that form a full bridge, a buck inductor 98, a filter inductor 100 and a filter capacitor 102. Also shown is the lamp 12, which is external to said inverter. Inductor 100 may also be utilized as a secondary winding of an ignition circuit 10 (FIG. 1).

In some designs a two-switch PFC configuration (FIG. 3) is operated in three different modes every half cycle of the input AC voltage, i.e. boost, buck-boost and buck modes. If the switches on-time and off-time are properly adjusted according to the ratio of the input AC voltage to the output DC voltage and according to the PFC operation mode, an input current having a sine wave shape can be realized. This process requires four mode-transitions each AC voltage cycle. However, whereas the boost and buck modes are rather efficient, the buck-boost mode can still be improved. Furthermore, the efficiency of the transitions from mode to mode, i.e., from buck to buck-boost, from buck-boost to boost and vice versa, also can be improved, e.g., by reducing watt-loss, peak current and THD.

Figure 5:
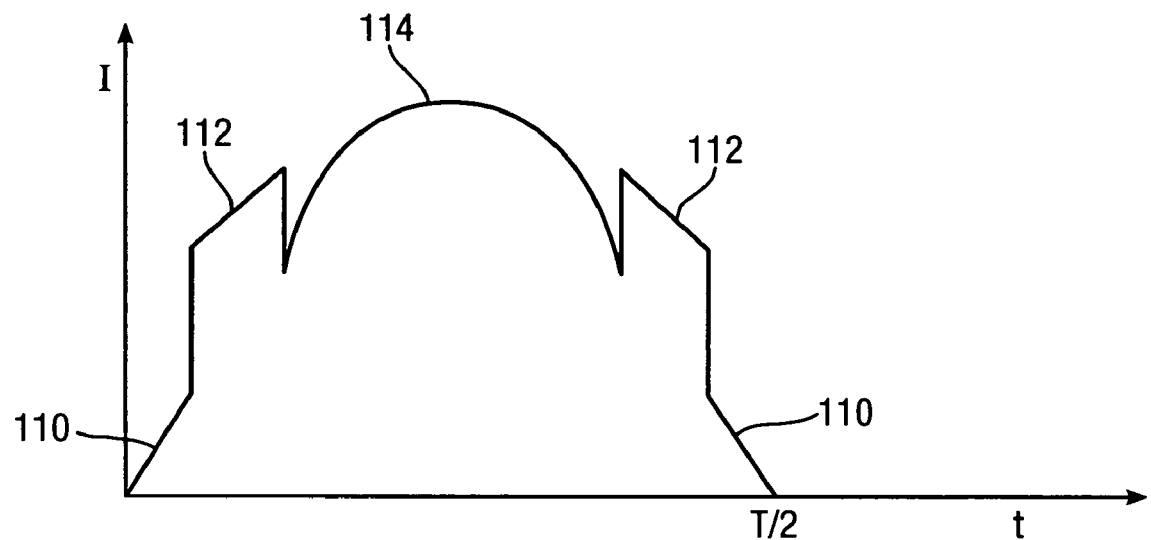

FIG. 5 illustrates a plot of typical prior art input current half wave envelope comprising boost phases 110, buck-boost phases 112 and a buck phase 114. The shape of the current wave envelope is not smooth due to the abrupt transitions between the various phases. Transition from mode to mode is required according to the instantaneous ratio of the input voltage to the output voltage of the PFC. Under these circumstances the PFC starts operating in the boost mode when the AC cycle begins. In boost mode the buck switch is conducting continuously and the boost switch is operating at high frequency. When the input AC voltage approaches the DC output voltage value, the PFC shifts to a second mode called buck-boost. In this mode, both switches are active at high frequency. The buck-boost mode is maintained until the AC input voltage value rises above the output DC voltage, e.g. by 30%, after which the PFC shifts to the buck mode in which the buck switch is activated at high frequency and the boost switch is open. The buck mode is maintained during the rest of the rising portion of the AC voltage cycle, and during the initial phase of the falling portion of the input AC voltage. During the falling portion, when the AC input voltage value approaches the value of the DC output voltage from above, the PFC shifts back to the buck-boost mode and later to the boost mode according to the logic described above. This process requires four mode transitions during each AC voltage cycle. Now whereas the boost and buck modes are rather efficient, the buck-boost mode calls for improvement.

Figure 6:
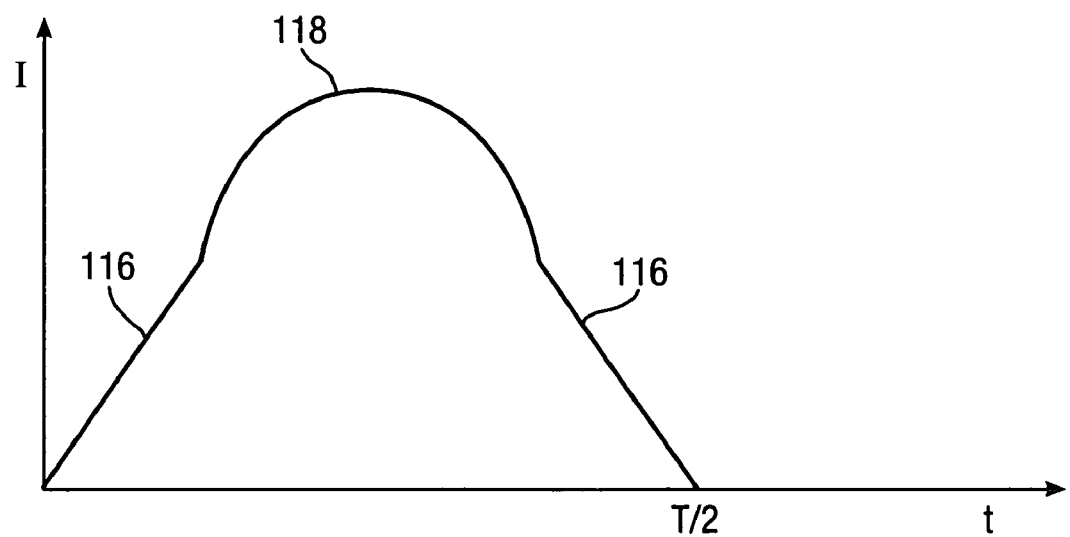

FIG. 6 illustrates a plot of input current half wave envelope according to the invention including boost and modified boost stages 116, during which the transitions between classical boost and modified boost are gradual and smooth. Also shown is the buck stage 118. According to the invention the operation of the PFC comprises at least boost and modified-boost modes, both critically discontinuous. A boost mode is achieved with the buck switch continuously conducting and the boost switch operating at high frequency. When the input AC instantaneous voltage approaches the value of the output DC voltage, a "watchdog" timer is activated in the control circuit of the buck switch. The timer blocks the buck switch when the discharge duration of the inductor becomes too long, say, twice the charge time. Consequently the inductor discharge is substantially accelerated and thereby appropriate operating frequency is maintained. When the inductor current has discharged, both switches start conducting near zero current of the inductor, e.g. both turn-on during sloping down of the current, or both during sloping up, or one turns-on during sloping down and the other during sloping up of the current, thus initiating a new cycle of discharge-time-limited boost (modified boost). The modified-boost mode during the phase in which the input AC voltage is approximately between 70 to 130% of the output DC voltage value, improves the efficiency of the circuit and smoothes the transitions between the modes.

Referring again to FIG. 3 illustrating a PFC circuit, there are seen buck switch 82, boost switch 88 and inductor 86. During buck operation mode, switch 88 is permanently open while switch 82 changes states at high frequency. During boost operation mode, switch 82 is permanently closed while switch 88 changes states at high frequency. During buck-boost operation mode and during transitions between said operation modes, both switches change states at high frequency.

The switches 82, 88 are activated near zero current of the inductor 86, e.g. both activated during sloping down of the current, or both are activated during sloping up, or one during sloping down and the other during sloping up of the current. The on-time of each switch is then controlled in order to facilitate smooth transition (e.g., reduction of wattloss, peak currents and THD) between the modes of operation. The on-time control is governed in the following manner:

buck switch 82 on-time is gradually reduced and the boost switch 88 on-time is gradually increased in order to facilitate smooth transition from buck operation mode to buck-boost operation mode and from boost operation mode to buck-boost operation mode of the PFC.

buck switch 82 on-time is gradually increased and the boost switch 88 on-time is gradually reduced in order to facilitate smooth transition from buck-boost operation mode to boost operation mode and from buck-boost operation mode to buck operation mode of the PFC.

Further characterizing features of the invention comprise:

feeding the lamp with nearly square wave current having a crest factor not higher than 1.2 and a frequency which is lower than the lowest acoustic resonance frequency of the lamp's arc, i.e., the acoustic resonance frequency of the system that includes the lamp, arc-tube and its contents;

maintaining the inverter's input DC voltage at a low value adapted to the mean value of the lamp voltage, e.g. below 70V plus a mean value of the lamp voltage during the transient high-current/low-voltage operation mode of the lamp following ignition;

limiting the current during CCM by controlling the discharge time of an inductor, e.g., the inverter's inductor 98;

limiting the current during DCCM by controlling the charge time of an inductor, e.g., the inverter's inductor 98;

sensing zero current indirectly by sensing the voltage commutation at the switches (e.g. inverter's switches) by the commutation sensor 26;

measuring lamp voltage at a single lamp's electrode, e.g. by voltage sensor 18, whenever the second electrode is at ground potential and at both electrodes, e.g. by voltage sensors 16 and 18, when each electrode is above ground potential;

protecting against voltage surges by a short-term shutoff of the ballast input circuit said shutoff is activated by the controller during the development period of the surge and deactivated following the fading of the surge;

protecting against overheating by reducing the power delivered to the lamp;

protecting against short circuit by shutoff of the ballast circuit by several parallel procedures triggered by the controller 20 and related to known lamp characteristics, e.g., a comparison of a short-term mean value of the lamp voltage to a long-term mean value of the lamp voltage, sensing of high current and comparing long term mean value of the lamp voltage with a predetermined minimum;

controlling the ignition pulse generation by the voltage across the terminals of the ignitor circuit 10, and limiting the power delivered by the DC supply (e.g. the PFC) to a predetermined maximum.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for operating a High Intensity Discharge (HID) lamp, having stable and transient operating phases, by means of a digitally controlled circuit that includes a DC supply and an inverter, said process being characterized by that during the stable operating phase of the lamp, an input DC voltage to the inverter is maintained at a value depending on the lamp voltage, wherein said lamp is connected to said inverter by means of a first and a second connection and lamp voltage is computed from data collected from voltage measurement at the first lamp connection whenever the second connection is at ground potential or voltage measurement is effected at each connection when said first and said second connections are above ground potential.

2. The process as claimed in claim 1, wherein said DC voltage value is between the lamp voltage and substantially twice the lamp voltage.

3. The process as claimed in claim 1, wherein said process further comprising:

igniting the lamp; and during a period of transient operating phase of the lamp following ignition, maintaining the inverter's input DC voltage at a low value adapted to the mean value of the lamp voltage.

4. The process as claimed in claim 3, wherein ignition pulse generation is controlled through the voltage across the ignitor circuit terminals.

5. The process as claimed in claim 1, wherein the lamp is fed with current having a frequency which is lower than the lowest acoustic resonance frequency of the lamp's arc.

6. The process as claimed in claim 1, wherein the lamp current is sensed based on peak value detection.

7. The process as claimed in claim 6, wherein the lamp is fed with direct current or current at low frequency during the initial operating phase that follows ignition.

8. The process as claimed in claim 1, wherein during continuous-current mode (CCM), the current is limited by controlling a discharge time of an inductor.

9. The process as claimed in claim 1, wherein during discontinuous-current mode (DCCM), the current is limited by controlling the charge time of an inductor.

10. The process as claimed in claim 1, wherein the power delivered by the DC supply is limited to a predetermined maximum.

11. The process as claimed in claim 1, wherein the DC supply is fed from an outer source and the control of the input current of said DC supply is based on mean values of the ratio between the input voltage of the DC supply and its output voltage.

12. The process as claimed in claim 1, wherein the lamp is fed with a substantially square wave current.

13. The process claimed in claim 12, wherein during portions of the input voltage wave, the switches are activated near zero current of said inductor and each switch on-time is controlled in order to facilitate smooth transition between the operation modes of the PFC.

14. The process claimed in claim 13, wherein said buck switch on-time is gradually reduced and said boost switch on-time is gradually increased in order to facilitate efficient transition from buck operation mode to buck-boost operation mode and from boost operation mode to buck-boost operation mode of the PFC.

15. The process claimed in claim 13, wherein said buck switch on-time is gradually increased and said boost switch on-time is gradually reduced in order to facilitate efficient transition from buck-boost operation mode to boost operation mode and from buck-boost operation mode to buck operation mode of the PFC.

16. A process for operating a High Intensity Discharge (HID) lamp, having stable and transient operating phases, by means of a digitally controlled circuit that includes a DC supply and an inverter, said process being characterized by that during the stable operating phase of the lamp, an input DC voltage to the inverter is maintained at a value depending on the lamp voltage, wherein protection against voltage surges is provided by a short term circuit shutoff procedure that is activated during the development period of a surge and deactivated following the fading of the surge.

17. The process as claimed in claim 16, wherein said DC voltage value is between the lamp voltage and substantially twice the lamp voltage.

18. The process as claimed in claim 16, wherein said process further comprising:
   igniting the lamp; and
   during a period of transient operating phase of the lamp following ignition, maintaining the inverter's input DC voltage at a low value adapted to the mean value of the lamp voltage.

19. The process as claimed in claim 16, wherein the lamp is fed with current having a frequency which is lower than the lowest acoustic resonance frequency of the lamp's arm.

20. The process as claimed in claim 16, wherein during continuous-current mode (CCM), the current is limited by controlling a discharge time of an inductor.

21. The process as claimed in claim 16, wherein during discontinuous-current mode (DCCM), the current is limited by controlling the charge time of an inductor.

22. The process as claimed in any of claim 16, wherein the lamp current is sensed based on peak value detection.

23. The process as claimed in claim 16, wherein the power delivered by the DC supply is limited to a predetermined maximum.

24. The process as claimed in claim 16, wherein the DC supply is fed from an outer source and the control of the input current of said DC supply is based on mean values of the ratio between the input voltage of the DC supply and its output voltage.

25. The process as claimed in claim 16, wherein the lamp is fed with a substantially square wave current.

26. A process for operating a High Intensity Discharge (HID) lamp, having stable and transient operating phases, by means of a digitally controlled circuit that includes a DC supply and an inverter, said process being characterized by that during the stable operating phase of the lamp, an input DC voltage to the inverter is maintained at a value depending on the lamp voltage, wherein protection against short circuit is provided by a circuit shutoff operated by several parallel procedures triggered by the controller and related to known lamp characteristics.

27. The process as claimed in claim 26, wherein said process includes a comparison of a short-term mean value of lamp voltage to a long-term mean value of lamp voltage.

28. The process as claimed in claim 26, wherein said procedures include sensing of high current.

29. The process as claimed in claim 26, wherein said procedures include comparing a long term mean value of lamp voltage to a predetermined minimum voltage value.

30. The process as claimed in claim 26, wherein said DC voltage value is between the lamp voltage and substantially twice the lamp voltage.

31. The process as claimed in claim 26, wherein said process further comprising:
   igniting the lamp; and
   during a period of transient operating phase of the lamp following ignition, maintaining the inverter's input DC voltage at a low value adapted to the mean value of the lamp voltage.

32. The process as claimed in claim 26, wherein the lamp is fed with current having a frequency which is lower than the lowest acoustic resonance frequency of the lamp's arm.

33. The process as claimed in claim 26, wherein during continuous-current mode (CCM), the current is limited by controlling a discharge time of an inductor.

34. The process as claimed in claim 26, wherein during discontinuous-current mode (DCCM), the current is limited by controlling the charge time of an inductor.

35. The process as claimed in any of claim 26, wherein the lamp current is sensed based on peak value detection.

36. The process as claimed in claim 26, wherein the power delivered by the DC supply is limited to a predetermined maximum.

37. The process as claimed in claim 26, wherein the DC supply is fed from an outer source and the control of the input current of said DC supply is based on mean values of the ratio between the input voltage of the DC supply and its output voltage.

38. The process as claimed in claim 26, wherein the lamp is fed with a substantially square wave current.

39. A process for operating a High Intensity Discharge (HID) lamp, having stable and transient operating phases, by means of a digitally controlled circuit that includes a DC supply and an inverter, said process being characterized by that during the stable operating phase of the lamp, an input DC voltage to the inverter is maintained at a value depending on the lamp voltage, wherein zero current is indirectly sensed by sensing voltage across at least one switch.

40. The process as claimed in claim 39, wherein said DC voltage value is between the lamp voltage and substantially twice the lamp voltage.

41. The process as claimed in claim 39, wherein said process further comprising:
  igniting the lamp; and
    during a period of transient operating phase of the lamp following ignition, maintaining the inverter's input DC voltage at a low value adapted to the mean value of the lamp voltage.

42. The process as claimed in claim 39, wherein the lamp is fed with current having a frequency which is lower than the lowest acoustic resonance frequency of the lamp's arm.

43. The process as claimed in claim 39, wherein during continuous-current mode (CCM), the current is limited by controlling a discharge time of an inductor.

44. The process as claimed in claim 39, wherein during discontinuous-current mode (DCCM), the current is limited by controlling the charge time of an inductor.

45. The process as claimed in claim 39, wherein during discontinuous-current mode (DCCM), the current is limited by controlling the charge time of an inductor.

46. The process as claimed in any of claim 39, wherein the lamp current is sensed based on peak value detection.

47. The process as claimed in claim 39, wherein the power delivered by the DC supply is limited to a predetermined maximum.

48. The process as claimed in claim 39, wherein the DC supply is fed from an outer source and the control of the input current of said DC supply is based on mean values of the ratio between the input voltage of the DC supply and its output voltage.

49. The process as claimed in claim 39, wherein the lamp is fed with a substantially square wave current.

50. A process for operating a High Intensity Discharge (HID) lamp, having stable and transient operating phases, by means of a digitally controlled circuit that includes a DC supply and an inverter, said process being characterized by that during the stable operating phase of the lamp, an input DC voltage to the inverter is maintained at a value depending on the lamp voltage, wherein said DC supply is a PFC comprising a buck switch, a boost switch and an inductor, and during periods of time of the input voltage wave, both switches are activated near zero current of said inductor and the buck switch on-time is limited in order to accelerate the discharge of the inductor.

51. The process as claimed in claim 50, wherein said DC voltage value is between the lamp voltage and substantially twice the lamp voltage.

52. The process as claimed in claim 50, wherein said process further comprising:
  igniting the lamp; and
    during a period of transient operating phase of the lamp following ignition, maintaining the inverter's input DC voltage at a low value adapted to the mean value of the lamp voltage.

53. The process as claimed in claim 50, wherein the lamp is fed with current having a frequency which is lower than the lowest acoustic resonance frequency of the lamp's arm.

54. The process as claimed in claim 50, wherein during continuous-current mode (CCM), the current is limited by controlling a discharge time of an inductor.

55. The process as claimed in any of claim 50, wherein the lamp current is sensed based on peak value detection.

56. The process as claimed in claim 50, wherein the power delivered by the DC supply is limited to a predetermined maximum.

57. The process as claimed in claim 50, wherein the DC supply is fed from an outer source and the control of the input current of said DC supply is based on mean values of the ratio between the input voltage of the DC supply and its output voltage.

58. The process as claimed in claim 50, wherein the lamp is fed with a substantially square wave current.

* * * * *